United States Patent [19]
Gilliam

[11] Patent Number: 5,174,540
[45] Date of Patent: Dec. 29, 1992

[54] VIBRATION ISOLATING MOUNTING GROMMET

[75] Inventor: David R. Gilliam, Bristol, Tenn.

[73] Assignee: Bristol Compressors

[21] Appl. No.: 742,720

[22] Filed: Aug. 5, 1991

Related U.S. Application Data

[63] Continuation of Ser. No. 312,868, Feb. 21, 1989, abandoned.

[51] Int. Cl.⁵ ............................................. F16M 13/00
[52] U.S. Cl. .................................. 248/635; 267/141.3
[58] Field of Search ............... 248/615, 635, 632, 633, 248/634; 267/141, 141.3, 141.2

[56] References Cited

U.S. PATENT DOCUMENTS

| | | | |
|---|---|---|---|
| 2,447,712 | 8/1948 | Nathan | 248/615 |
| 2,520,757 | 8/1950 | Cain | 248/635 X |
| 3,138,358 | 6/1964 | Comstock et al. | 248/635 |
| 3,220,676 | 11/1965 | Butts | 248/635 |

FOREIGN PATENT DOCUMENTS 2519745  7/1983  France .................................. 248/635

Primary Examiner—David L. Talbott

[57] ABSTRACT

A mounting grommet for compressors adapted for attachment to the mounting feet thereof and to the compressor mounts of a refrigeration unit, comprising an elastomeric, generally cylindrical body adapted for attachment to a compressor mount by bolt means passing through the bore of the body, a radially peripheral portion of the body being formed intermediate the length of said body to provide an upwardly extending annular shoulder adapted to contact and support a compressor foot and receive substantial downward force therefrom, the radially inner surface of the shoulder being spaced from radially outer and adjacent portions of the body, and the radially outer surface of the shoulder lying radially outwardly of all other peripheral portions of the body, to thereby provide a diagonal shear or distortion line in response to the application of downward force to the shoulder.

14 Claims, 2 Drawing Sheets

VIBRATION ISOLATING MOUNTING GROMMET

This is a continuation of Ser. No. 07/312,868 filed Feb. 21, 1989 now abandoned.

This invention concerns mounting grommets such as are employed for supporting, in semi-flexible condition, relatively small refrigeration compressors within hermetically or semi-hermetically sealed shells. The invention particularly concerns such grommets which are of elastomeric material, the physical configuration of which takes increased advantage of certain of the inherent shear or distortional properties of the material to markedly improve its vibration isolating effectiveness.

Heretofore, compressor mounting grommets of the elastomeric types typically have been shaped such that the vertical or axial load forces thereon, primarily derived from compressor weight and the vertical component or momentum of the vibrating compressor, are directed vertically downwardly on the grommet in its axial direction. Such grommets are shown and described, for example, in the TECUMSEH PRODUCTS COMPANY publication entitled "Compressor Vibration Isolators", 10 pages, and in the Jul. 15, 1978 COPELAND CORPORATION publication entitled "MOUNTING PARTS FOR COPELAND COMPRESSORS", 10 pages. These forces therefore are resisted essentially only by the reactive compressive forces generated by the elastomer. For such elastomers, in general, the higher the durometer rating the less flexibility and compression of the grommet and the less vibrational force absorption and attenuation of noise transmitted to the compressor unit shell and exterior piping is achieved. However, in general, the higher the durometer rating, the greater is the useful life of the grommet. It is thus seen that while softer elastomeric materials can be used to achieve greater vibrational force absorptions and noise attenuation, the longevity of the grommet is diminished.

A principal object therefore of the present invention is to provide an elastomeric, compressor mounting grommet which maximizes the use of the inherent flexibility and vibrational force absorbing properties of the elastomer, such that higher durometer and longer lasting elastomer may be employed.

Further objects and advantages hereinafter becoming evident have been attained in accordance with the present invention defined as a mounting grommet for compressors adapted for attachment to the mounting feet thereof and to the compressor mounts of a refrigeration unit, comprising an elastomeric, generally cylindrical body adapted for attachment to a compressor mount by bolt means passing through the bore of said body, a radially peripheral portion of said body being formed intermediate the length of said body to provide upwardly extending annular shoulder means adapted to contact and support a compressor foot and receive substantial downward force therefrom, the radially inner surface of said shoulder means being spaced from radially outer and adjacent portions of said body, and the radially outer surface of said shoulder means lying radially outwardly of all other peripheral portions of said body.

In certain preferred embodiments:

the base of said shoulder means provides a diagonal shear or distortion line in response to the application of downward force to said shoulder means;

the distortion line is downwardly and radially outwardly directed;

the base of said shoulder means is integral with an underlying annular portion of said body, which portion lies radially inwardly of the radially outer surface of said shoulder means; and the grommet is affixed to a compressor mount and having its shoulder means contacting and supporting a compressor foot, whereby downward force on said shoulder means places it in said diagonal distortion.

This invention will be further understood from the following description and drawings wherein.

Figure 1:
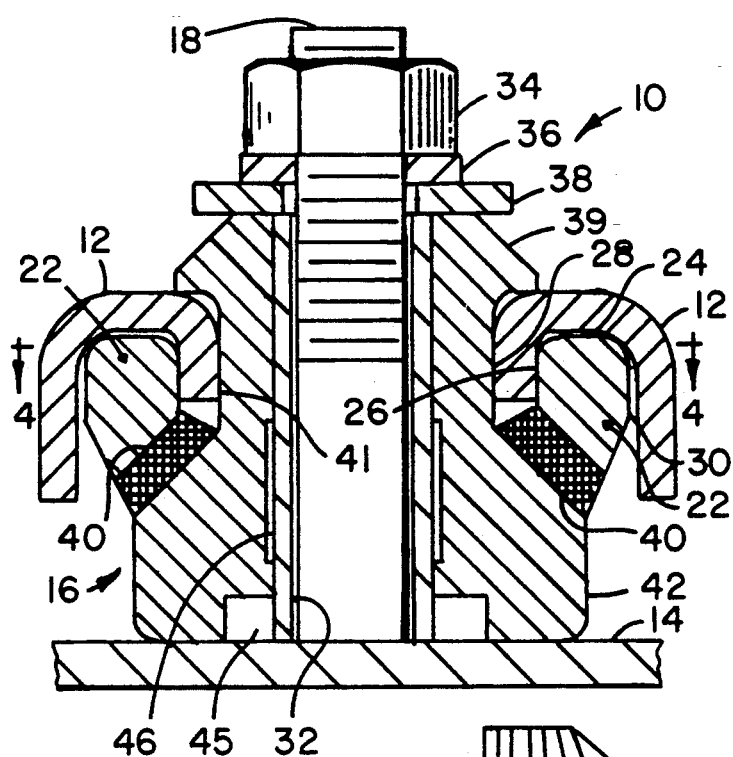
FIG. 1 is a vertical cross-sectional view of the present grommet affixed to a compressor mount and to a compressor foot.

Referring to the drawings and to the language of claim 1 hereof, grommet 10 which is adapted for attachment to compressor mounting feet 12 and to compressor mounts 14 of a refrigeration unit, comprises an elastomeric, generally cylindrical or annular body 16 adapted for attachment to a compressor mount by bolt means 18 passing through the bore 20 of said body, a radially peripheral portion 22 of said body being formed intermediate the length of said body to provide upwardly presented annular shoulder means 24 adapted to contact and support a compressor foot and receive substantial downward force therefrom, the radially inner surface 26 of said shoulder means being spaced from radially outer and adjacent portions 28 of said body, and the radially outer surface 30 of said shoulder means lying radially outwardly of all other peripheral portions of said body.

The locations and numbers of such mounting grommets and particular configurations of the mounting feet and compressor mounts may be varied, and a typical assembly employing elastomeric grommets is shown in U.S. Pat. No. 4,427,349, the disclosure of which is incorporated herein by reference.

The grommet is composed of elastomeric material including natural and synthetic rubbers such as: polybutadiene rubbers (BRs); polyisoprene rubbers (IRs); the 1000 series of styrene-butadiene rubber (SBR); nitrile rubbers (NBRs); butyl rubber (IIR); ethylene-propylene terpolymer (EPDM) which is preferred herein; silicone rubbers; types GN, GNA, GW, FB, and GRT neoprenes (CRs); polysulfides; polyacrylate rubbers; epichlorohydrin rubbers; fluoroelastomers (FDM); Hypalon, a chlorosulfonated polyethylene (CSM); halogenated butyl, e.g., chlorobutyl (CIIR) and bromobutyl (BIIR); chlorinated polyethylene rubbers (CPEs); polyurethanes; and thermoplastic rubbers. The elastomer preferably has a Durometer hardness of from about 25 to about 100.

The grommet is preferably secured to the compressor mount or base 14 by stud 18 affixed as by welding or the like to the mount, which stud slidably passes up through a metal sleeve 32 on which the grommet is tightly fitted. Also, bolts or screws threaded into the base 14 could be used to affix the grommet. This sleeve allows nut 34 to be tightened down against lock washer 36 and retaining washer 38 without vertically compressing or preloading the grommet to a non-regulated extent. In assembling the compressor foot 12 on the grommet, the upper resilient tapered portion 39 of the grommet is inserted forcibly upwardly through the aperture 41 in the foot prior to securing the grommet onto the stud 18.

Figure 2:
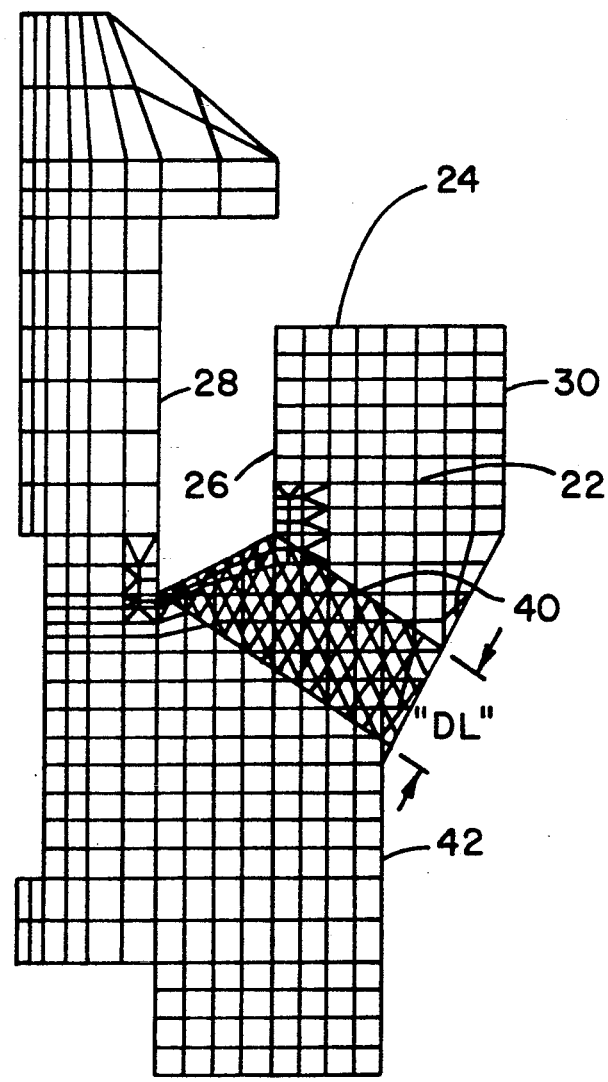
FIG. 2 is a vertical cross-sectional, internal segment, graphic representation of a portion of the grommet in non-loaded condition.
Figure 3:
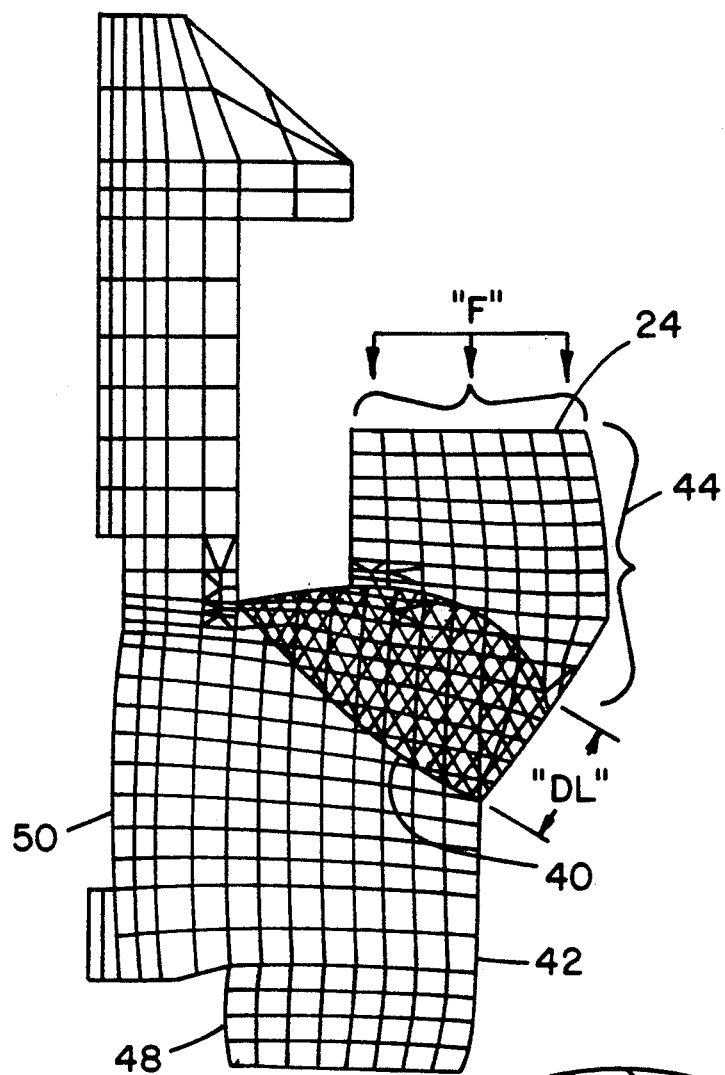
FIG. 3 is a view of the grommet as in FIG. 2 but under load and showing a typical distortion pattern thereof.
Figure 4:
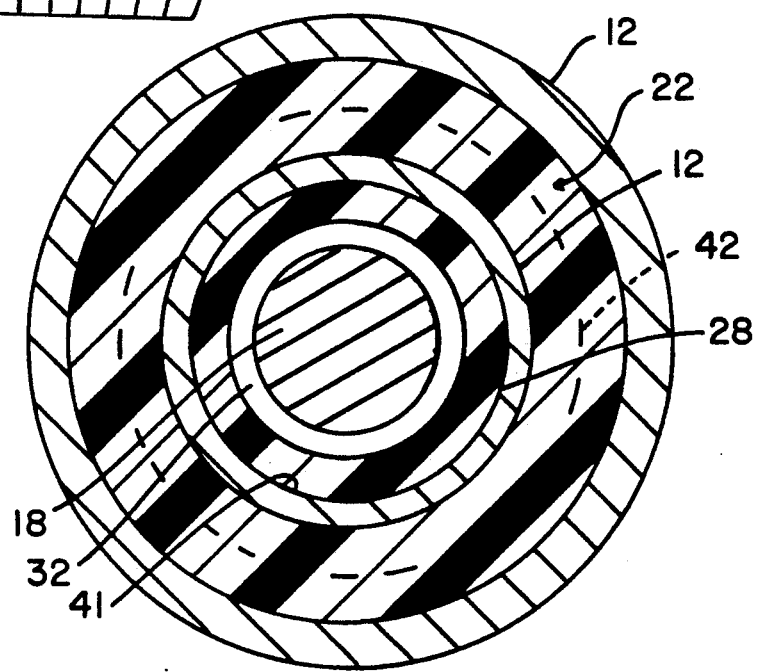
FIG. 4 is an enlarged cross-sectional view of FIG. 1 taken along line 4—4 thereof in the direction of the arrows.

The aforesaid diagonal shear or distortion line "DL", shown as an approximate area in FIGS. 1-3, is within the annular portion 22 of the grommet which provides the shoulder means 24 including its base 40 and which lies adjacent the underlying annular heel 42 of the grommet and which is integrally formed therewith. It is preferred that from about ⅓ to about ⅔ of the mass of shoulder means 24 (annular portion 22) lay radially outwardly of the heel 42. It is seen from FIG. 3 that downward force "F" applied to the top of shoulder means 24 will tend to shear or distort the base 40 and further facilitate the outward bulging of adjacent portions 44 of the shoulder means. It is particularly noted that this outward bulging or shear dislocation is much more extensive than the same vertical force would effect on a grommet which did not have an equivalent shear line. Also, the bulging possesses not only radial components but vertical components as well as indicated by the substantial downward slanting of the horizontal segment lines within the "DL" area and adjacent portions of the shoulder means and the heel 42. These distortions are at least in part caused by actual bending of the shoulder means through lateral forces developed by the diagonal distortion of the shoulder base 40. These bending forces represent a substantial portion of the vertical energy applied initially against the top of the shoulder but which was consumed in simple bending of the shoulder means rather than in straight compression of the elastomer. The net result is that a higher durometer elastomer can be used to achieve the same or better levels of vibration and noise attenuation, since a substantial portion of the vibrational energy imparted thereto is consumed in shear dislocation rather than in straight compression.

It is further preferred that annular recesses such as 45 and 46 be provided in the grommet to consume portions of the vibrational energy by allowing some room for inward bulging or dislocation 48 and 50 caused in part by the dislocation of the shoulder base 40.

The invention has been described in detail with particular reference to preferred embodiments thereof, but it will be understood that variations and modifications will be effected within the spirit and scope of the invention.

I claim:

1. A mounting grommet for compressors adapted for attachment to the mounting feet thereof and to the compressor mounts of a refrigeration unit, comprising an elastomeric, generally cylindrical body having an inner end and outer end and having a substantially axially positioned bore therethrough, said grommet being adapted for attachment to a compressor mount by bolt means passing through the bore of said body and abutting said outer end and affixed to said mount adjacent said inner end, a radially peripheral portion of said body being formed intermediate said ends thereof to provide upwardly extending annular shoulder means adapted to contact and support a compressor foot and receive substantial downward force therefrom, the radially inner surface of said shoulder means being spaced from radially outer and adjacent portions of said body which contain said bore, and the radially outer surface of said shoulder means lying radially outwardly of all other peripheral portions of said body.

2. The grommet of claim 1 wherein the base of said shoulder means provides a diagonal distortion line in response to the application of downward force to said shoulder means.

3. The grommet of claim 2 wherein said distortion line is downwardly and radially outwardly directed.

4. The grommet of claim 3 wherein the base of said shoulder means is integral with an underlying annular portion of said body, which portion lies radially inwardly of the radially outer surface of said shoulder means.

5. The grommet of claim 4 affixed to a compressor mount and having its shoulder means contacting and supporting a compressor foot, whereby downward force on said shoulder means places it in said diagonal distortion.

6. The grommet of claim 5 wherein said diagonal distortion dislocates the mean vertical axis of said shoulder means radially outwardly.

7. A refrigeration compressor having its mounting feet supported by grommets affixed to the compressor mounts within the shell of a compressor unit, each of said grommets comprising an elastomeric, generally cylindrical body attached to a compressor mount by bolt means passing through the bore of said body, a radially peripheral portion of said body being formed intermediate the length of said body to provide upwardly extending annular shoulder means contacting and supporting a compressor foot and receiving substantial downward force therefrom, the radially inner surface of said shoulder means being spaced from radially outer and adjacent portions of said body, and the radially outer surface of said shoulder means lying radially outwardly of all other peripheral portions of said body.

8. The compressor of claim 7 wherein the base of said shoulder means provides a diagonal distortion line in response to the application of downward force to said shoulder means.

9. The compressor of claim 8 wherein said distortion line is downwardly and radially outwardly directed.

10. The compressor of claim 9 wherein the base of said shoulder means is integral with an underlying annular portion of said body, which portion lies radially inwardly of the radially outer surface of said shoulder means.

11. The compressor of claim 10 wherein said downward force on said shoulder means places it in said diagonal distortion.

12. The grommet of claim 1 wherein the elastomer has a Durometer hardness of from about 25 to about 100.

13. The grommet of claim 12 wherein the elastomer is ethylene-propylene terpolymer (EPDM).

14. The grommet of claim 10 wherein from about ⅓ to about ⅔ of the mass of said shoulder means lies radially outwardly of said underlying annular portion.

* * * * *